United States Patent [19]
Wiedeman

[11] Patent Number: 5,640,386
[45] Date of Patent: Jun. 17, 1997

[54] TWO-SYSTEM PROTOCOL CONVERSION TRANSCEIVER REPEATER

[75] Inventor: Robert A. Wiedeman, Los Altos, Calif.

[73] Assignee: Globalstar L.P., San Jose, Calif.

[21] Appl. No.: 468,531

[22] Filed: Jun. 6, 1995

[51] Int. Cl.$^6$ .......................... H04B 7/216; H04J 13/02
[52] U.S. Cl. .................... 370/320; 370/321; 342/353; 375/201; 455/12.1; 455/13.1; 455/74
[58] Field of Search .......................... 370/18, 79, 85.13, 370/95.1, 95.3, 100.1, 104.1, 110.1, 49.5; 375/200, 201, 205, 206, 211, 219, 214; 455/7, 11.1, 12.1, 13.1, 13.2, 73, 74; 342/352, 353, 354, 356; 244/158 R

[56] References Cited

U.S. PATENT DOCUMENTS

| | | | |
|---|---|---|---|
| Re. 32,905 | 4/1989 | Baran | 370/104.1 |
| 4,901,307 | 2/1990 | Gilhousen et al. | 370/18 |
| 5,008,952 | 4/1991 | Davis et al. | 455/12 |
| 5,010,317 | 4/1991 | Schwendeman et al. | 340/311.1 |
| 5,073,900 | 12/1991 | Mallinckrodt | 375/205 |
| 5,081,703 | 1/1992 | Lee | 455/13.1 |
| 5,109,390 | 4/1992 | Gilhousen et al. | 375/205 |
| 5,119,225 | 6/1992 | Grant et al. | 359/172 |
| 5,216,427 | 6/1993 | Yan et al. | 342/352 |
| 5,233,626 | 8/1993 | Ames | 375/200 |
| 5,239,670 | 8/1993 | Schwendeman et al. | 455/13.1 |
| 5,260,967 | 11/1993 | Schilling | 375/205 |
| 5,287,541 | 2/1994 | Davis et al. | 455/12.1 |
| 5,303,286 | 4/1994 | Wiedeman | 379/59 |
| 5,339,330 | 8/1994 | Mallinckrodt | 375/205 |
| 5,351,269 | 9/1994 | Schilling | 375/205 |
| 5,410,568 | 4/1995 | Schilling | 375/205 |
| 5,410,728 | 4/1995 | Bertiger et al. | 455/13.1 |
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 R |
| 5,446,756 | 8/1995 | Mallinckrodt | 375/200 |
| 5,448,623 | 9/1995 | Wiedeman et al. | 379/59 |
| 5,469,468 | 11/1995 | Schilling | 375/200 |
| 5,481,533 | 1/1996 | Honig e tal. | 370/18 |

FOREIGN PATENT DOCUMENTS

| | | |
|---|---|---|
| 0421698A3 | 10/1991 | European Pat. Off. . |
| WO90/13186 | 11/1990 | WIPO . |
| WO91/09473 | 6/1991 | WIPO . |

OTHER PUBLICATIONS

Petition of American Mobile Satellite Corporation Before the FCC, Washington, DC 20554, dated Jun. 3, 1991, pp. 1–15.

Application of Motorola Satellite Communications, Inc. for IRIDIUM A Low earth Orbit Mobile Satellite System before the FCC, Washington, D.C. Dec. 1990, pp. 49–96.

(List continued on next page.)

Primary Examiner—Alpus H. Hsu
Attorney, Agent, or Firm—Perman & Green

[57] ABSTRACT

A system and method are disclosed for bidirectionally coupling a first satellite communication system to a second satellite communication system, wherein the first and second systems operate with different protocols. In a presently preferred embodiment of this invention the first system uses a spread spectrum (SS), code division multiple access (CDMA) technique wherein the satellites serve as simple 'bent pipe' repeaters for relaying communications between a user and a gateway. The second satellite communication system may be any other type of system having at least one characteristic that precludes direct communication between the first and the second systems. In an exemplary embodiment the second system uses a time division multiple access (TDMA) technique, and furthermore enables direct satellite-to-satellite communication links. A ground-based protocol conversion unit (70) is positioned for receiving a communication from a satellite of either the first or the second system, and includes circuitry for converting the transmission into a transmission that is suitable for transmission into the other system.

23 Claims, 7 Drawing Sheets

OTHER PUBLICATIONS

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey before the FCC, Washington, D.C. 20554, May 31, 1991 pp. 33–51.

Application of Ellipsat Corporation Ellipsat for the Authority to Construct Ellipso I An Elliptical Orbit Satellite System, before the FCC, Washington, D.C. 20554, Nov. 2, 1990, pp. 5–34.

Application of Loral Cellular Systems, Corp., Globalstar Mobile Communications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

"Current and Future Mobile Satellite Communication Systems", S. Kato et al., IEICE Trasactions, vol. F 74, No. 8 Aug. 1991, pp. 2201–2210.

"Digital Network Oriented Mobile Radio Satellite System as and Integrated Part of The GSM Cellular Radio System in Europe", P. Dondl, Deutsch Bundespost/Fernmeldetechniches Zentralmt/Darmstadt, Fed. Rep. Germ. Sep. 21, 1989.

"The OmniTRACS Mobile Satellite Communications and Positioning System ", E. Tiedemann, Jr. et al., Vehicle Electronics in the 90's; Proceedings of the In'l. Congress on Transporation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium System—A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

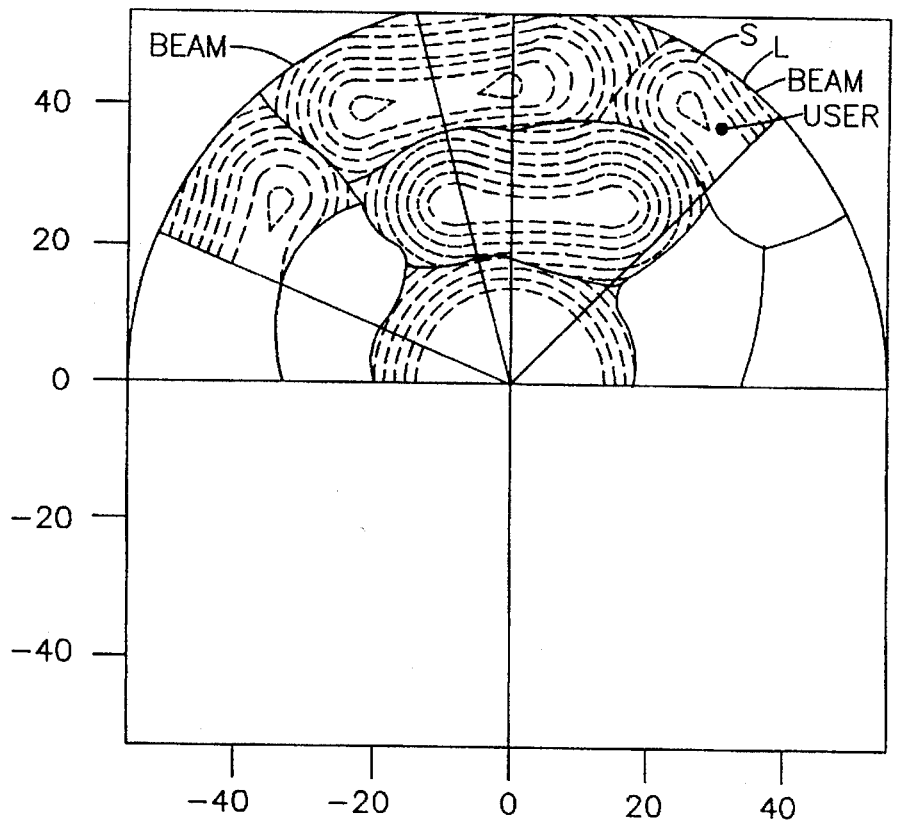
FIG. 3B
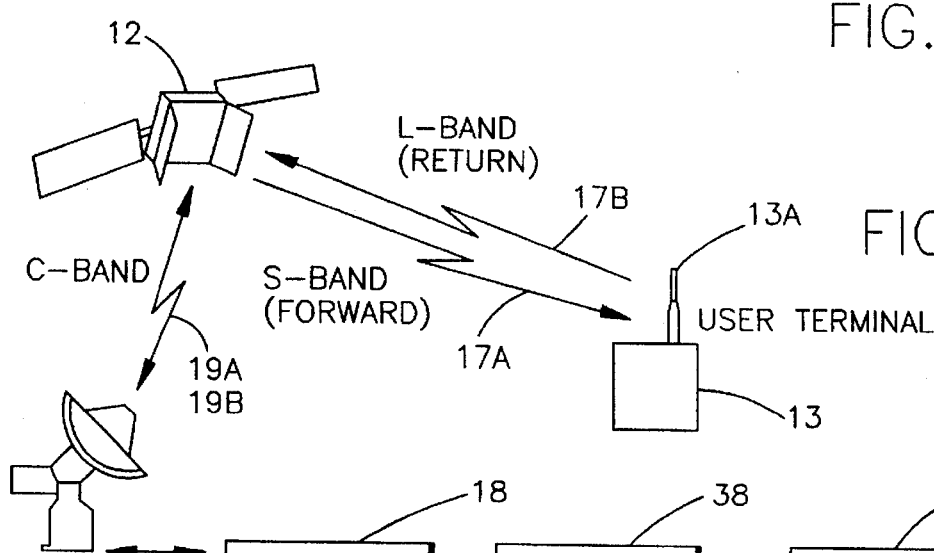
FIG. 4
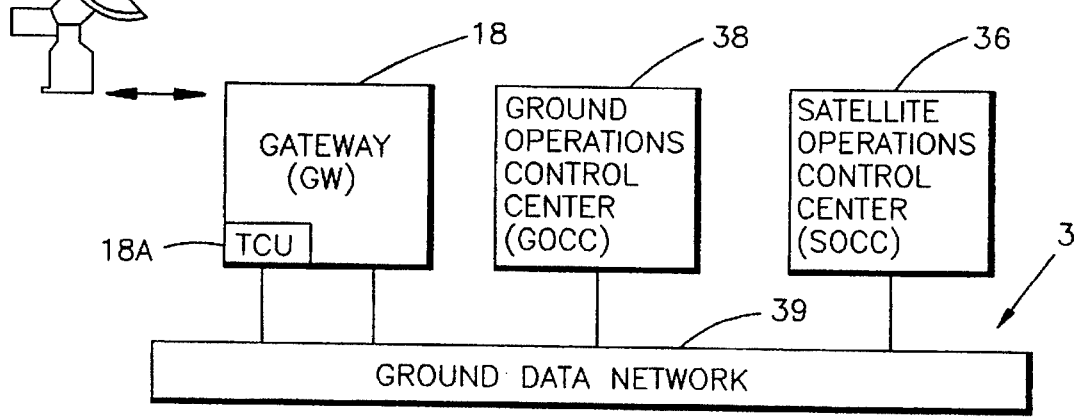

1

TWO-SYSTEM PROTOCOL CONVERSION TRANSCEIVER REPEATER

FIELD OF THE INVENTION

This invention relates generally to communication systems and, in particular, to satellite-based communication systems.

BACKGROUND OF THE INVENTION

Satellite-based communications systems are well are represented in the prior art. By example, reference is made to U.S. Pat. No. 5,303,286, issued on Apr. 12, 1994 to Robert A. Wiedeman, and which is entitled "Wireless Telephone/Satellite Roaming System". Reference is also made to the numerous U.S. Patents, foreign patents, and other publications that are of record in U.S. Pat. No. 5,303,286.

Of particular interest herein is a class of satellite-based communication systems that employs multiple satellites in a low earth orbit, referred to as a 'LEO' system or LEOS. LEOS are characterized by moving patterns of signal 'footprints' on the ground, where each footprint corresponds to the coverage area of one or more beams that are transmitted and received by a given satellite as it orbits the earth. The satellites communicate with terrestrial stations which may be referred to as gateways. The satellites may serve as repeaters for relaying a communication, such as a telephone call, from one ground station to another. One of the ground stations may be a gateway while another may be a user having a hand-held or vehicle mounted transceiver.

Other types of satellite-based communication systems exist or have been proposed wherein individual satellites are capable of relaying a communication directly to another satellite, without requiring an intermediate ground station. However, this added functionality comes at the cost of increased satellite complexity.

Reference can be had to U.S. Pat. No. 5,008,952 (Apr. 16, 1991), entitled "Global Satellite Communication System with Geographic Protocol Conversion", by Davis et al. In accordance with the teaching of this U.S. Patent a satellite paging system employs cross-linked non-synchronous satellites that include a programmable encoder for encoding, into a second data format, received data packets that are encoded in a first data format. The second data format is intended to correspond to the signalling requirements of portable communication receivers in a particular geographical delivery area.

As may be realized, this approach requires an increase in complexity of each satellite, as the satellite must perform on-board signal processing of the received transmissions for routing the received transmissions and for performing the data packet encoding function.

SUMMARY OF THE INVENTION

This invention is directed to a system and method for coupling a first satellite communication system to a second satellite communication system, wherein the first and second systems operate with different protocols.

In a presently preferred embodiment of this invention the first system uses a spread spectrum (SS), code division multiple access (CDMA) technique wherein the satellites serve as simple 'bent pipe' repeaters for relaying communications between a user and a gateway. The second satellite communication system may be any other type of system having at least one characteristic that precludes direct communication between the first and the second systems. In an example described below the second system uses a time division multiple access (TDMA) technique, and furthermore enables direct satellite-to-satellite communication links.

A terrestrial or ground-based protocol conversion unit is positioned for receiving a communication from a satellite of either the first or the second system, and includes circuitry for converting the transmission into a transmission that is suitable for transmission into the other system. For example, a SS-CDMA transmission is received from the first system, is translated into a TDMA format, and is transmitted into the second system. The communication may then be relayed between at least two satellites of the second system before being transmitted to a ground station of the second system for connection to the local public switched telephone network (PSTN).

A hybrid communication system in accordance with this invention is formed by placing a protocol converter between two dissimilar satellite-based communication systems, thereby linking the two dissimilar systems for bidirectional voice and/or data communications.

BRIEF DESCRIPTION OF THE DRAWINGS

The above set forth and other features of the invention are made more apparent in the ensuing Detailed Description of the Invention when read in conjunction with the attached Drawings, wherein:

FIG. 3B illustrates a portion of a beam pattern that is associated with one of the satellites of FIG. 1;

FIG. 4 is a block diagram that depicts the ground equipment support of satellite telemetry and control functions;

DETAILED DESCRIPTION OF THE INVENTION

Figure 1:
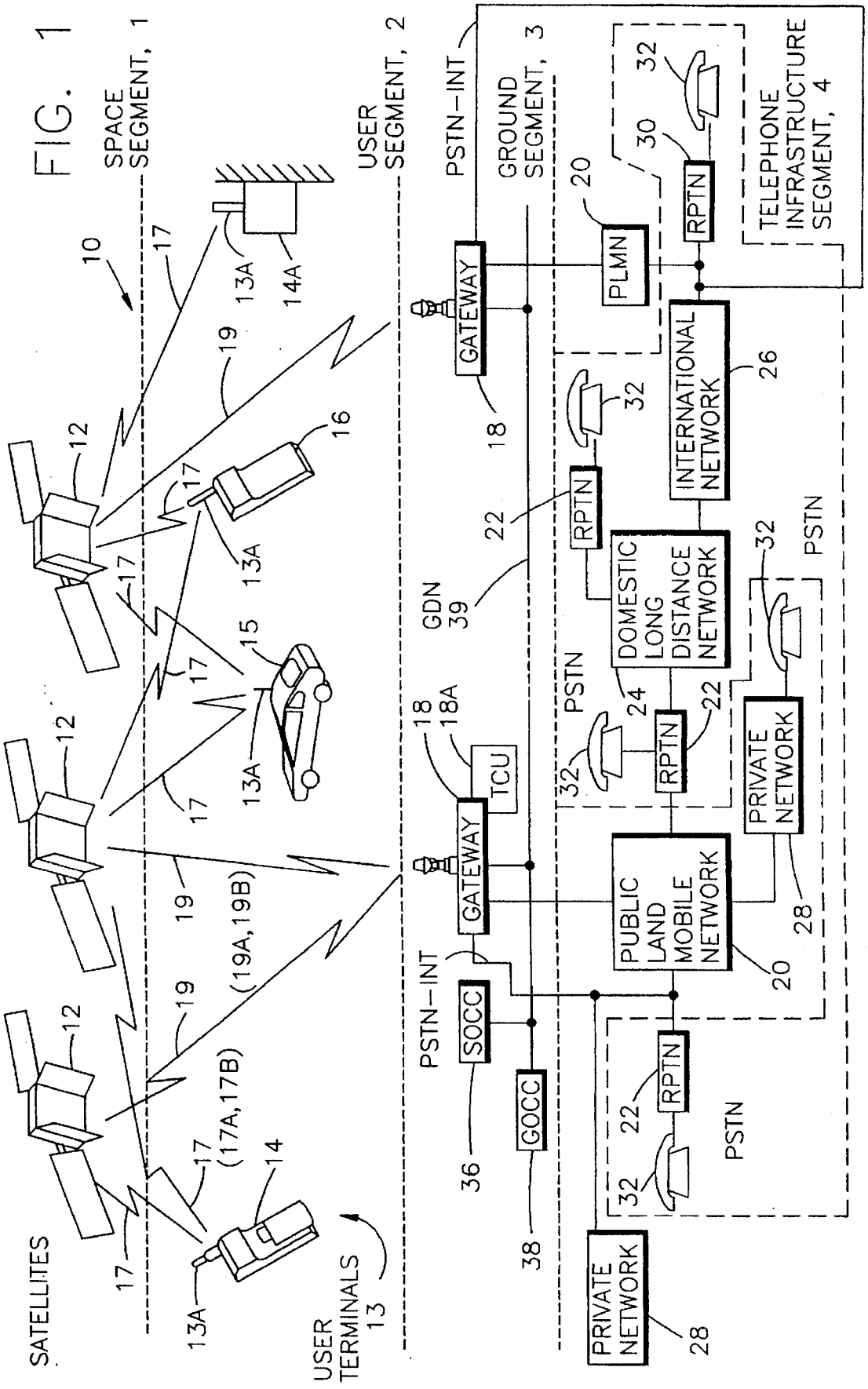
FIG. 1 is block diagram of a satellite communication system that is constructed and operated in accordance with a presently preferred embodiment of this invention.

FIG. 1 illustrates a presently preferred embodiment of a satellite communication system 10 that is suitable for use with the presently preferred embodiment of the protocol conversion system of this invention. Before describing this invention in detail, a description will first be made of the communication system 10 so that a more complete understanding may be had of the protocol conversion system of this invention.

The communication system 10 may be conceptually subdivided into a plurality of segments 1, 2, 3 and 4. Segment 1 is referred to herein as a space segment, segment 2 as a user segment, segment 3 as a ground (terrestrial) segment, and segment 4 as a telephone system infrastructure segment.

In the presently preferred embodiment of this invention there are a total of 48 satellites in, by example, a 1414 km Low Earth Orbit (LEO). The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a gateway (GW) 18 coverage area to or from other points on the earth's surface (by way of the PSTN), via one or more gateways 18 and one or more of the satellites 12, possibly also using a portion of the telephone infrastructure segment 4.

It is noted at this point that the foregoing and ensuing description of the system 10 represents but one suitable embodiment of a communication system within which the teaching of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a spread spectrum (SS), code division multiple access (CDMA) technique. The presently preferred SS-CDMA technique is similar to the TIA/EIA Interim Standard, "Mobile Station-Base Station Compatibility Standard for Dual-Mode Wideband Spread Spectrum Cellular System" TIA/EIA/IS-95, July 1993, although other spread spectrum and CDMA techniques and protocols can be employed.

The low earth orbits permit low-powered fixed or mobile user terminals 13 to communicate via the satellites 12, each of which functions, in a presently preferred embodiment of this invention, solely as a "bent pipe" repeater to receive a communication traffic signal (such as speech and/or data) from a user terminal 13 or from a gateway 18, convert the received communication traffic signal to another frequency band, and to then re-transmit the converted signal. That is, no on-board signal processing of a received communication traffic signal occurs, and the satellite 12 does not become aware of any intelligence that a received or transmitted communication traffic signal may be conveying.

Furthermore, there need be no direct communication link or links between the satellites 12. That is, each of the satellites 12 receives a signal only from a transmitter located in the user segment 2 or from a transmitter located in the ground segment 3, and transmits a signal only to a receiver located in the user segment 2 or to a receiver located in the ground segment 3.

The user segment 2 may include a plurality of types of user terminals 13 that are adapted for communication with the satellites 12. The user terminals 13 include, by example, a plurality of different types of fixed and mobile user terminals including, but not limited to, handheld mobile radio-telephones 14, vehicle mounted mobile radio-telephones 15, paging/messaging-type devices 16, and fixed radio-telephones 14a. The user terminals 13 are preferably provided with omnidirectional antennas 13a for bidirectional communication via one or more of the satellites 12.

It is noted that the fixed radio-telephones 14a may employ a directional antenna. This is advantageous in that it enables a reduction in interference with a consequent increase in the number of users that can be simultaneously serviced with one or more of the satellites 12.

It is further noted that the user terminals 13 may be dual use devices that include circuitry for also communicating in a conventional manner with a terrestrial cellular system.

Figure 3A:
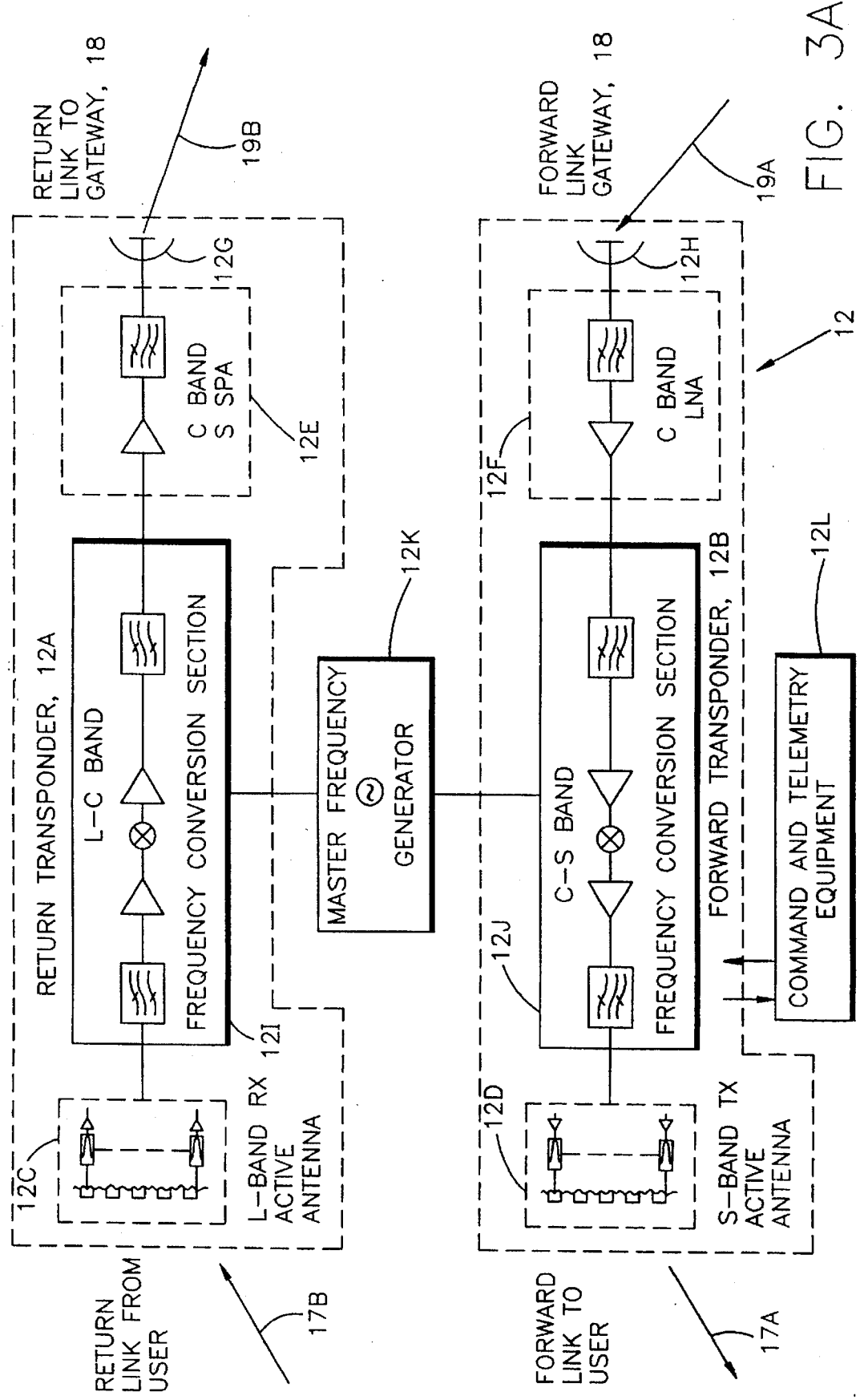
FIG. 3A is a block diagram of the communication payload of one of the satellites of FIG. 1.

Referring also to FIG. 3A, the user terminals 13 may be capable of operating in a full duplex mode and communicate via, by example, L-band RF links (uplink or return link 17b) and S-band RF links (downlink or forward link 17a) through return and forward satellite transponders 12a and 12b, respectively. The return L band RF links 17b may operate within a frequency range of 1.61 GHz to 1.625 GHz, a bandwidth of 16.5 MHz, and are modulated with packetized digital voice signals and/or data signals in accordance with the preferred spread spectrum technique. The forward S band RF links 17a may operate within a frequency range of 2.485 GHz to 2.5 GHz, a bandwidth of 16.5 MHz. The forward RF links 17a are also modulated at a gateway 18 with packetized digital voice signals and/or data signals in accordance with the spread spectrum technique.

The 16.5 MHz bandwidth of the forward link is partitioned into 13 channels with up to, by example, 128 users being assigned per channel. The return link may have various bandwidths, and a given user terminal 13 may or may not be assigned a different channel than the channel assigned on the forward link. However, when operating in the diversity reception mode on the return link (receiving from two or more satellites 12), the user is assigned the same forward and return link RF channel for each of the satellites.

The ground segment 3 includes at least one but generally a plurality of the gateways 18 that communicate with the satellites 12 via, by example, a full duplex C band RF link 19 (forward link 19a (to the satellite), return link 19b (from the satellite)) that operates within a range of frequencies generally above 3 GHz and preferably in the C-band. The C-band RF links bi-directionally convey the communication feeder links, and also convey satellite commands to the satellites and telemetry information from the satellites. The forward feeder link 19a may operate in the band of 5 GHz to 5.25 GHz, while the return feeder link 19b may operate in the band of 6.875 GHz to 7.075 GHz.

The satellite feeder link antennas 12g and 12h are preferably wide coverage antennas that subtend a maximum earth coverage area as seen from the LEO satellite 12. In the presently preferred embodiment of the communication system 10 the angle subtended from a given LEO satellite 12 (assuming 10° elevation angles from the earth's surface) is approximately 110°. This yields a coverage zone that is approximately 3600 miles in diameter.

The L-band and the S-band antennas are multiple beam antennas that provide coverage within an associated terrestrial service region. The L-band and S-band antennas 12d and 12c, respectively, are preferably congruent with one another, as depicted in FIG. 3B. That is, the transmit and receive beams from the spacecraft cover the same area on the earth's surface, although this feature is not critical to the operation of the system 10.

As an example, several thousand full duplex communications may occur through a given one of the satellites 12. In accordance with a feature of the system 10, two or more satellites 12 may each convey the same communication between a given user terminal 13 and one of the gateways 18. This mode of operation, as described in detail below, thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band (approximately 3 GHz to approximately 7 GHz), for example the Ku band (approximately 10 GHz to approximately 15 GHz) or the Ka band (above approximately 15 GHz).

The gateways 18 function to couple the communication payload or transponders 12a and 12b (FIG. 3A) of the satellites 12 to the telephone infrastructure segment 4. The transponders 12a and 12b include an L-band receive antenna 12c, S-band transmit antenna 12d, C-band power amplifier 12e, C-band low noise amplifier 12f, C-band antennas 12g and 12h, L band to C band frequency conversion section 12i, and C band to S band frequency conversion section 12j. The satellite 12 also includes a master frequency generator 12k and command and telemetry equipment 12l.

Reference in this regard may also be had to U.S. Pat. No. 5,422,647, by E. Hirshfield and C. A. Tsao, entitled "Mobile Communications Satellite Payload" (U.S. Ser. No. 08/060, 207).

The telephone infrastructure segment 4 is comprised of existing telephone systems and includes Public Land Mobile Network (PLMN) gateways 20, local telephone exchanges such as regional public telephone networks (RPTN) 22 or other local telephone service providers, domestic long distance networks 24, international networks 26, private networks 28 and other RPTNs 30. The communication system 10 operates to provide bidirectional voice and/or data communication between the user segment 2 and Public Switched Telephone Network (PSTN) telephones 32 and non-PSTN telephones 32 of the telephone infrastructure segment 4, or other user terminals of various types, which may be private networks.

Also shown in FIG. 1 (and also in FIG. 4), as a portion of the ground segment 3, is a Satellite Operations Control Center (SOCC) 36, and a Ground Operations Control Center (GOCC) 38. A communication path, which includes a Ground Data Network (GDN) 39 (see FIG. 2), is provided for interconnecting the gateways 18 and TCUs 18a, SOCC 36 and GOCC 38 of the ground segment 3. This portion of the communication system 10 provides overall system control functions.

Figure 2:
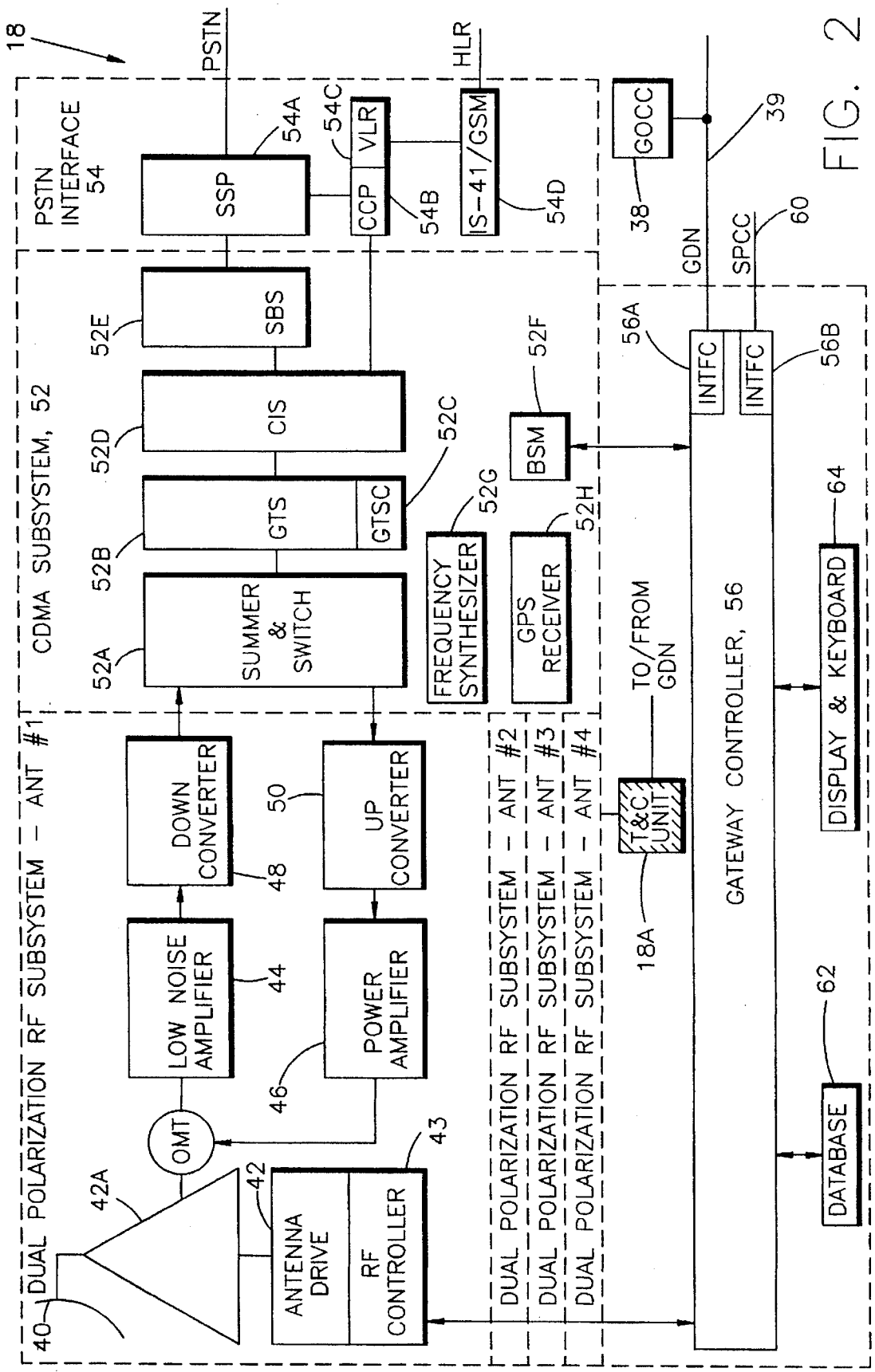
FIG. 2 is a block diagram of one of the gateways of FIG. 1.

FIG. 2 shows one of the gateways 18 in greater detail. Each gateway 18 includes up to four dual polarization RF C-band sub-systems each comprising a dish antenna 40, antenna driver 42 and pedestal 42a, low noise receivers 44, and high power amplifiers 46. All of these components may be located within a radome structure to provide environmental protection.

The gateway 18 further includes down converters 48 and up converters 50 for processing the received and transmitted RF carrier signals, respectively. The down converters 48 and the up converters 50 are connected to a CDMA sub-system 52 which, in turn, is coupled to the Public Switched Telephone Network (PSTN) though a PSTN interface 54. As an option, the PSTN could be bypassed by using satellite-to-satellite links.

The CDMA sub-system 52 includes a signal summer/switch unit 52a, a Gateway Transceiver Subsystem (GTS) 52b, a GTS Controller 52c, a CDMA Interconnect Subsystem (CIS) 52d, and a Selector Bank Subsystem (SBS) 52e. The CDMA sub-system 52 is controlled by a Base Station Manager (BSM) 52f and functions in a manner similar to a CDMA-compatible (for example, an IS-95 compatible) base station. The CDMA sub-system 52 also includes the required frequency synthesizer 52g and a Global Positioning System (GPS) receiver 52h.

The PSTN interface 54 includes a PSTN Service Switch Point (SSP) 54a, a Call Control Processor (CCP) 54b, a Visitor Location Register (VLR) 54c, and a protocol interface 54d to a Home Location Register (HLR). The HLR may be located in the cellular gateway 20 (FIG. 1) or, optionally, in the PSTN interface 54.

The gateway 18 is connected to telecommunication networks through a standard interface made through the SSP 54a. The gateway 18 provides an interface, and connects to the PSTN via Primary Rate Interface (PRI). The gateway 18 is further capable of providing a direct connection to a Mobile Switching Center (MSC).

The gateway 18 provides SS-7 ISDN fixed signalling to the CCP 54b. On the gateway-side of this interface, the CCP 54b interfaces with the CIS 52d and hence to the CDMA sub-system 52. The CCP 54b provides protocol translation functions for the system Air Interface (AI), which may be similar to the IS-95 Interim Standard for CDMA communication.

Blocks 54c and 54d generally provide an interface between the gateway 18 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system. The gateway 18 supports user terminal authentication for system 10/AMPS phones and for system 10/GSM phones. In service areas where there is no existing telecommunications infrastructure, an HLR can be added to the gateway 18 and interfaced with the SS-7 signalling interface.

A user making a call out of the user's normal service area (a roamer) is accommodated by the system 10 if authorized. In that a roamer may be found in any environment, a user may employ the same terminal equipment to make a call from anywhere in the world, and the necessary protocol conversions are made transparently by the gateway 18. The protocol interface 54d is bypassed when not required to convert, by example, GSM to AMPS.

It is within the scope of the teaching of this invention to provide a dedicated, universal interface to the cellular gateways 20, in addition to or in place of the conventional "A" interface specified for GSM mobile switching centers and vendor-proprietary interfaces to IS-41 mobile switching centers. It is further within the scope of this invention to provide an interface directly to the PSTN, as indicated in FIG. 1 as the signal path designated PSTN-INT.

Overall gateway control is provided by the gateway controller 56 which includes an interface 56a to the above-mentioned Ground Data Network (GDN) 39 and an interface 56b to a Service Provider Control Center (SPCC) 60. The gateway controller 56 is generally interconnected to the gateway 18 through the BSM 52f and through RF controllers 43 associated with each of the antennas 40. The gateway controller 56 is further coupled to a database 62, such as a database of users, satellite ephemeris data, etc., and to an I/O unit 64 that enables service personnel to gain access to the gateway controller 56. The GDN 39 is also bidirectionally interfaced to a Telemetry and Command (T&C) unit 66 (FIGS. 1 and 4).

Referring to FIG. 4, the function of the GOCC 38 is to plan and control satellite utilization by the gateways 18, and to coordinate this utilization with the SOCC 36. In general, the GOCC 38 analyses trends, generates traffic plans, allocates satellite 12 and system resources (such as, but not limited to, power and channel allocations), monitors the performance of the overall system 10, and issues utilization instructions, via the GDN 39, to the gateways 18 in real time or in advance.

The SOCC 36 operates to maintain and monitor orbits, to relay satellite usage information to the gateway for input to the GOCC 38 via the GDN 39, to monitor the overall functioning of each satellite 12, including the state of the satellite batteries, to set the gain for the RF signal paths within the satellite 12, to ensure optimum satellite orientation with respect to the surface of the earth, in addition to other functions.

As described above, each gateway 18 functions to connect a given user to the PSTN for both signalling, voice and/or data communications and also to generate data, via database 62 (FIG. 2), for billing purposes. Selected gateways 18 include a Telemetry and Command Unit (TCU) 18a for receiving telemetry data that is transmitted by the satellites 12 over the return link 19b and for transmitting commands up to the satellites 12 via the forward link 19a. The GDN 39 operates to interconnect the gateways 18, GOCC 38 and the SOCC 36.

In general, each satellite 12 of the LEO constellation operates to relay information from the gateways 18 to the users (C band forward link 19a to S band forward link 17a), and to relay information from the users to the gateways 18 (L band return link 17b to C band return link 19b). This information includes SS-CDMA synchronization and paging channels, in addition to power control signals. Various CDMA pilot channels may also be used to monitor interference on the forward link. Satellite ephemeris update data is also communicated to each of the user terminals 13, from the gateway 18, via the satellites 12. The satellites 12 also function to relay signalling information from the user terminals 13 to the gateway 18, including access requests, power change requests, and registration requests. The satellites 12 also relay communication signals between the users and the gateways 18, and may apply security to mitigate unauthorized use.

In operation, the satellites 12 transmit spacecraft telemetry data that includes measurements of satellite operational status. The telemetry stream from the satellites, the commands from the SOCC 36, and the communication feeder links 19 all share the C band antennas 12g and 12h. For those gateways 18 that include a TCU 18a the received satellite telemetry data may be forwarded immediately to the SOCC 36, or the telemetry data may be stored and subsequently forwarded to the SOCC 36 at a later time, typically upon SOCC request. The telemetry data, whether transmitted immediately or stored and subsequently forwarded, is sent over the GDN 39 as packet messages, each packet message containing a single minor telemetry frame. Should more than one SOCC 36 be providing satellite support, the telemetry data is routed to all of the SOCCs.

The SOCC 36 has several interface functions with the GOCC 38. One interface function is orbit position information, wherein the SOCC 36 provides orbital information to the GOCC 38 such that each gateway 18 can accurately track up to four satellites that may be in view of the gateway. This data includes data tables that are sufficient to allow the gateways 18 to develop their own satellite contact lists, using known algorithms. The SOCC 36 is not required to known the gateway tracking schedules. The TCU 18a searches the downlink telemetry band and uniquely identifies the satellite being tracked by each antenna prior to the propagation of commands.

Another interface function is satellite status information that is reported from the SOCC 36 to the GOCC 38. The satellite status information includes both satellite/ transponder availability, battery status and orbital information and incorporates, in general, any satellite-related limitations that would preclude the use of all or a portion of a satellite 12 for communications purposes.

An important aspect of the system 10 is the use of SS-CDMA in conjunction with diversity combining at the gateway receivers and at the user terminal receivers. Diversity combining is employed to mitigate the effects of fading as signals arrive at the user terminals 13 or the gateway 18 from multiple satellites over multiple and different path lengths. Rake receivers in the user terminals 13 and the gateways 18 are employed to receive and combine the signals from multiple sources. As an example, a user terminal 13 or the gateway 18 provides diversity combining for the forward link signals or the return link signals that are simultaneously received from and transmitted through the multiple beams of the satellites 12.

In this regard the disclosure of U.S. Pat. No. 5,233,626, issued Aug. 3, 1993 to Stephen A. Ames and entitled "Repeater Diversity Spread Spectrum Communication System", is incorporated by reference herein in its entirety.

The performance in the continuous diversity reception mode is superior to that of receiving one signal through one satellite repeater, and furthermore there is no break in communication should one link be lost due to shadowing or blockage from trees or other obstructions that have an adverse impact on the received signal.

The multiple, directional, antennas 40 of a given one of the gateways 18 are capable of transmitting the forward link signal (gateway to user terminal) through different beams of one or more satellites 12 to support diversity combining in the user terminals 13. The omnidirectional antennas 13a of the user terminals 13 transmit through all satellite beams that can be "seen" from the user terminal 13.

Each gateway 18 supports a transmitter power control function to address slow fades, and also supports block interleaving to address medium to fast fades. Power control is implemented on both the forward and reverse links. The response time of the power control function is adjusted to accommodate for a worst case 30 msec satellite round trip delay.

The block interleavers (53d, 53e, 53f, FIG. 5) operate over a block length that is related to vocoder 53g packet frames. An optimum interleaver length trades off a longer length, and hence improved error correction, at the expense of increasing the overall end-to-end delay. A preferred maximum end-to-end delay is 150 msec or less. This delay includes all delays including those due to the received signal alignment performed by the diversity combiners, vocoder 53g processing delays, block interleaver 53d–53f delays, and the delays of the Viterbi decoders (not shown) that form a portion of the CDMA sub-system 52.

Figure 5:
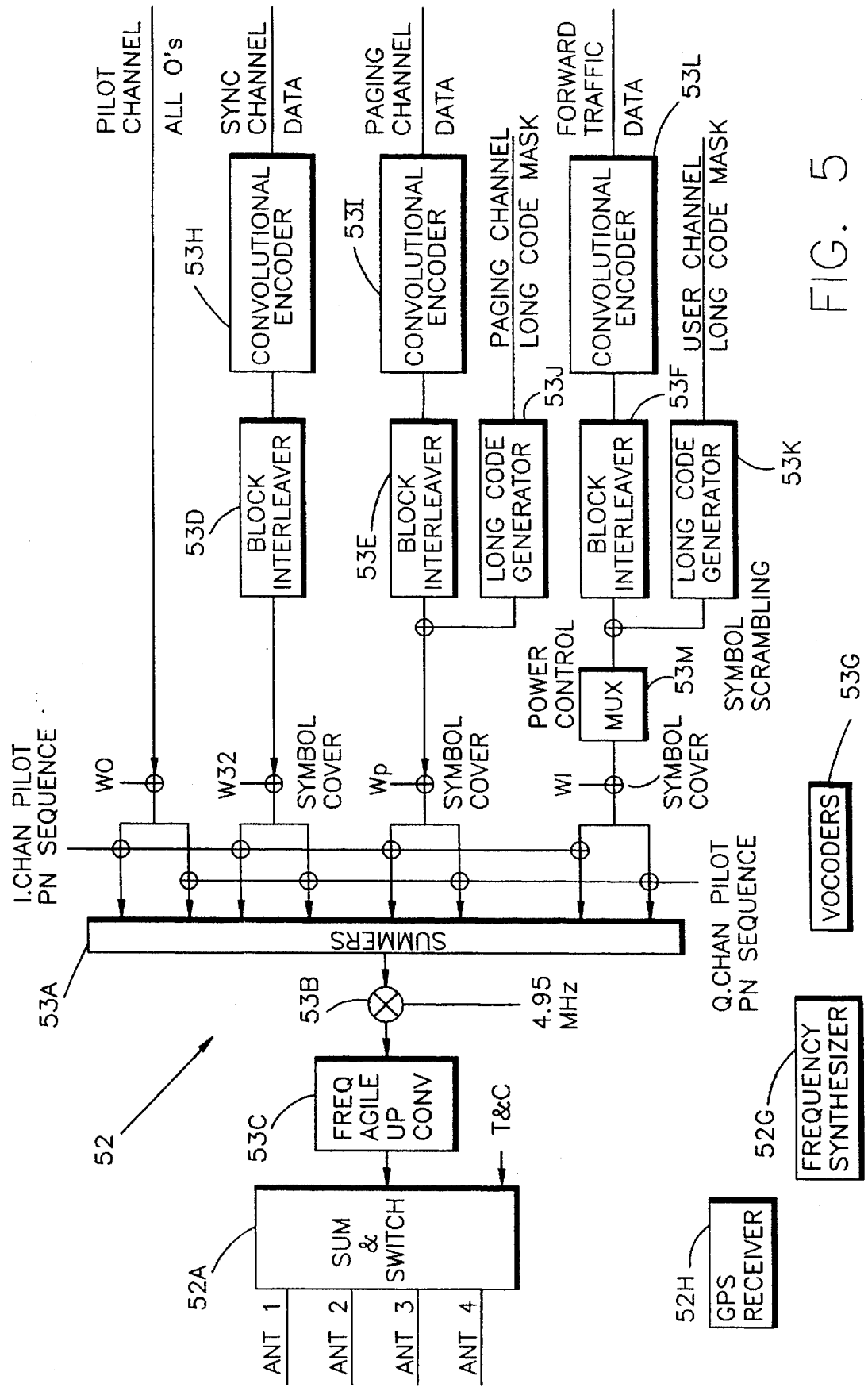
FIG. 5 is block diagram of the CDMA sub-system of FIG. 2.

FIG. 5 is a block diagram of the forward link modulation portion of the CDMA sub-system 52 of FIG. 2. An output of a summer block 53a feeds a frequency agile up-converter 53b which in turn feeds the summer and switch block 52a. The telemetry and control (T&C) information is also input to the block 52a.

An unmodulated direct sequence SS pilot channel generates an all zeros Walsh Code at a desired bit rate. This data stream is combined with a short PN code that is used to separate signals from different gateways 18 and different satellites 12. If used, the pilot channel is modulo 2 added to the short code and is then QPSK or BPSK spread across the CDMA FD RF channel bandwidth. The following different pseudonoise (PN) code offsets are provided: (a) a PN code offset to allow a user terminal 13 to uniquely identify a gateway 18; (b) a PN code offset to allow the user terminal 13 to uniquely identify a satellite 12; and (c) a PN code offset to allow the user terminal 13 to uniquely identify a given one of the 16 beams that is transmitted from the satellite 12. Pilot PN codes from different ones of the satellites 12 are assigned different time/phase offsets from the same pilot seed PN code.

If used, each pilot channel that is transmitted by the gateway 18 may be transmitted at a higher or lower power level than the other signals. A pilot channel enables a user terminal 13 to acquire the timing of the forward CDMA channel, provides a phase reference for coherent demodulation, and provides a mechanism to perform signal strength comparisons to determine when to initiate handoff. The use of the pilot channel is not, however, mandatory, and other techniques can be employed for this purpose.

The Sync channel generates a data stream that includes the following information: (a) time of day; (b) transmitting gateway identification; (c) satellite ephemeris; and (d) assigned paging channel. The Sync data is applied to a convolution encoder 53h where the data is convolutionally encoded and subsequently block interleaved to combat fast fades. The resulting data stream is modulo two added to the synchronous Walsh code and QPSK or BPSK spread across the CDMA FD RF channel bandwidth.

The Paging channel is applied to a convolutional encoder 53i where it is convolutionally encoded and is then block interleaved. The resulting data stream is combined with the output of a long code generator 53j. The long PN code is used to separate different user terminal 13 bands. The paging channel and the long code are modulo two added and provided to a symbol cover where the resulting signal is modulo two added to the Walsh Code. The result is then QPSK or BPSK spread across the CDMA FD RF channel bandwidth.

In general, the paging channel conveys several message types which include: (a) a system parameter message; (b) an access parameter message; and (c) a CDMA channel list message.

The system parameter message includes the configuration of the paging channel, registration parameters, and parameters to aid in acquisition. The access parameters message includes the configuration of the access channel and the access channel data rate. The CDMA channel list message conveys, if used, an associated pilot identification and Walsh code assignment.

The vocoder 53k encodes the voice into a PCM forward traffic data stream. The forward traffic data stream is applied to a convolutional encoder 53l where it is convolutionally encoded and then block interleaved in block 53f. The resulting data stream is combined with the output of a user long code block 53k. The user long code is employed to separate different subscriber channels. The resulting data stream is then power controlled in multiplexer (MUX) 53m, modulo two added to the Walsh code, and then QPSK or BPSK spread across the CDMA FD RF communication channel bandwidth.

The gateway 18 operates to demodulate the CDMA return link(s). There are two different codes for the return link: (a) the zero offset code; and (b) the long code. These are used by the two different types of return link CDMA Channels, namely the access channel and the return traffic channel.

For the access channel the gateway 18 receives and decodes a burst on the access channel that requests access. The access channel message is embodied in a long preamble followed by a relatively small amount of data. The preamble is the user terminal's long PN code. Each user terminal 13 has a unique long PN code generated by a unique time offset into the common PN generator polynomial.

After receiving the access request, the gateway 18 sends a message on the forward link paging channel (blocks 53e, 53i, 53j) acknowledging receipt of the access request and assigning a Walsh code to the user terminal 13 to establish a traffic channel. The gateway 18 also assigns a frequency channel to the user terminal 13. Both the user terminal 13 and the gateway 18 switch to the assigned channel element and begin duplex communication using the assigned Walsh (spreading) code(s).

The return traffic channel is generated in the user terminal 13 by convolutionally encoding the digital data from the local data source or the user terminal vocoder. The data is then block interleaved at predetermined intervals and is applied to a 128-Ary modulator and a data burst randomizer to reduce clashing. The data is then added to the zero offset PN code and transmitted through one or more of the satellites 12 to the gateway 18.

The gateway 18 processes the return link by using, by example, a Fast Hadamard Transform (FHT) to demodulate the 128-Ary Walsh Code and provide the demodulated information to the diversity combiner.

The foregoing has been a description of a presently preferred embodiment of the communication system 10. In accordance with this invention the system 10 forms one satellite communication system, and a protocol conversion unit is employed to interface the system 10 to another, dissimilar satellite-based communication system.

As employed herein a communication protocol is intended to encompass all electrical and logical aspects of a communication system that serve to define the communication system. These electrical and logical aspects include, but are not limited to, the access type (CDMA, TDMA, frequency division multiple access (FDMA), etc.), modulation type (phase, amplitude, frequency, etc.), frequency plan, bit rate, signalling format, error protection technique, power level control, voice coding technique and rate(s), access and paging format, call set-up format, handover technique, etc.

Figure 6:
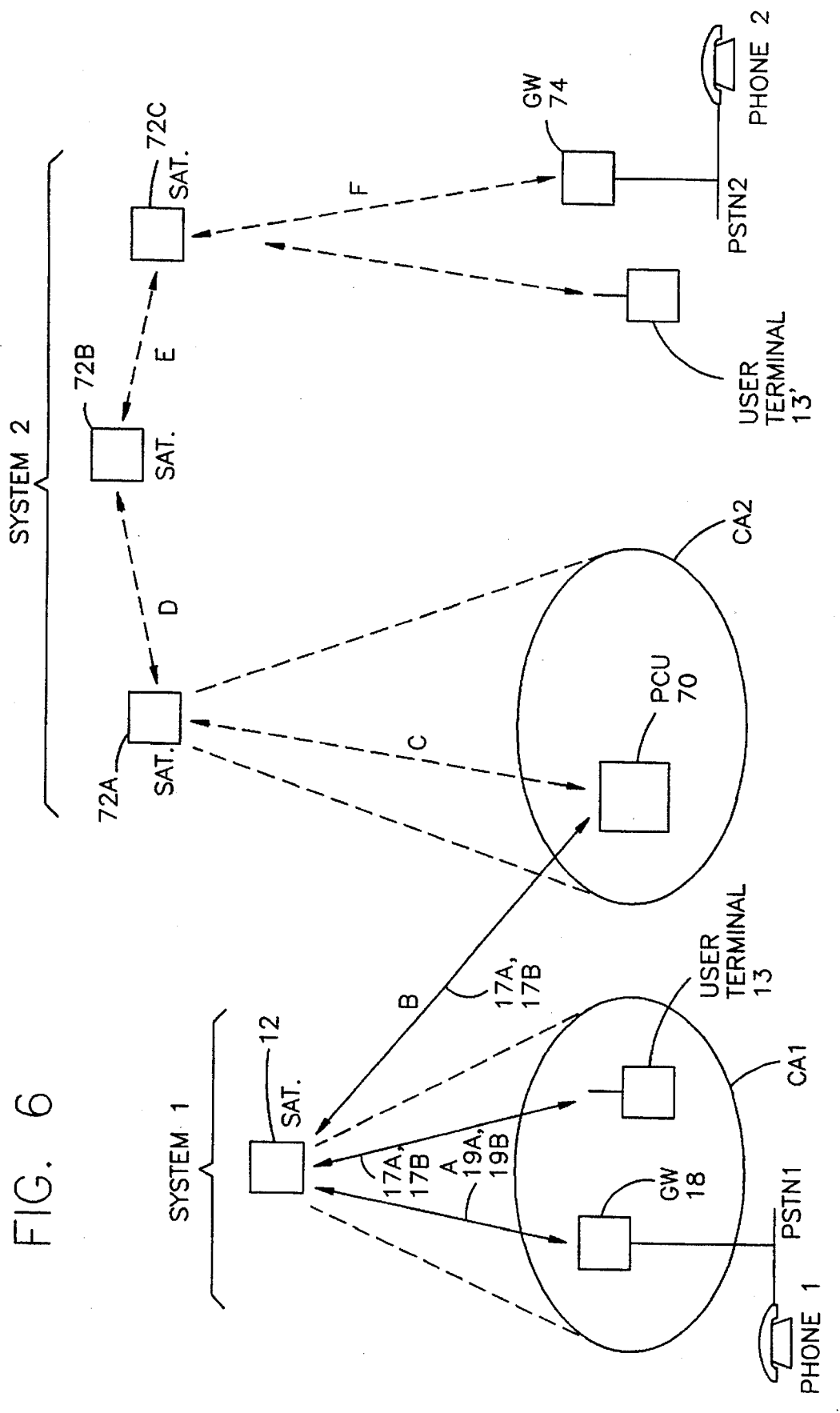
FIG. 6 is a block diagram that illustrates a communication being directed from a first satellite-based communication system to a second satellite-based communication system via a protocol conversion system of this invention.

Reference is now made to FIG. 6 for showing an exemplary embodiment of this invention. System 1 may be identical to the system 10 described in detail above and illustrated in FIGS. 1–5. A satellite 12 has an associated coverage area (CA1) within which is located a gateway 18. Coupled to the gateway 18 is a first PSTN having a first phone attached thereto. A second system (system 2) is comprised of satellites 72A–72C and at least one ground-based gateway 74. The gateway 74 is connected to a second PSTN having a second phone attached thereto. The satellite 72A has an associated coverage area (CA2) within which is located the protocol conversion unit (PCU) 70 of this invention. It is assumed that the PCU 70 is within view of both the satellites 12 and 72A and is able to transmit to and receive from both of these satellites.

As an example, and in response to a user placing a call from phone 1 to phone 2, the gateway 18 formulates a call request which is transmitted on the uplink A to the satellite 12. The satellite 12 repeats this transmission on the downlink B. In this case the downlink transmission (a SS-CDMA transmission) is received by the PCU 70. The PCU 70 demodulates the transmission to extract call destination information from the call request. The PCU 70 then routes the call to the phone 2 by translating the SS-CDMA transmission into a format that is compatible with the transmission format of the system 2.

For this example, it is assumed that the system 2 uses a TDMA format, wherein repeating frames are each comprised of a plurality of time slots, and wherein a user communication, including a voice portion, is transmitted in a digital format within at least one assigned time slot.

The PCU 70 transmits the translated call request signal in the TDMA format on the uplink C to the satellite 72A. The satellite 72A examines the call destination information and may route the call via a plurality of further satellites 72 if so required. In this example the call request is routed over signal path D from satellite 72A to satellite 72B, where it is further routed over signal path E to satellite 72C. Satellite 72C, in response to the call destination information, transmits the call request in the TDMA format on the downlink F to gateway 74. Gateway 74 establishes the call and connects same to the PSTN 2 for delivery to phone 2. Suitable acknowledgement messages are transmitted in the reverse order back to gateway 18. Thereafter a full duplex call is carried out between phone 1 and phone 2, with the call being in the SS-CDMA air interface format in system 1 and in the TDMA air interface format in system 2.

Further by example, and in response to a user terminal 13 placing a call to the phone 2 or to second user terminal 13', the gateway 18 formulates a call request which is transmitted on the uplink A to the satellite 12. The satellite 12 repeats this transmission on the downlink B which is received by the PCU 70. The PCU 70 demodulates the transmission to extract call destination information from the call request. The PCU 70 then routes the call to the phone 2 or the user terminal 13' by translating the SS-CDMA transmission into a format that is compatible with the transmission format of the system 2.

This technique can be employed for relaying, by example, voice communications, data communications, and pager messages and acknowledgments from one satellite system to another.

Figure 7:
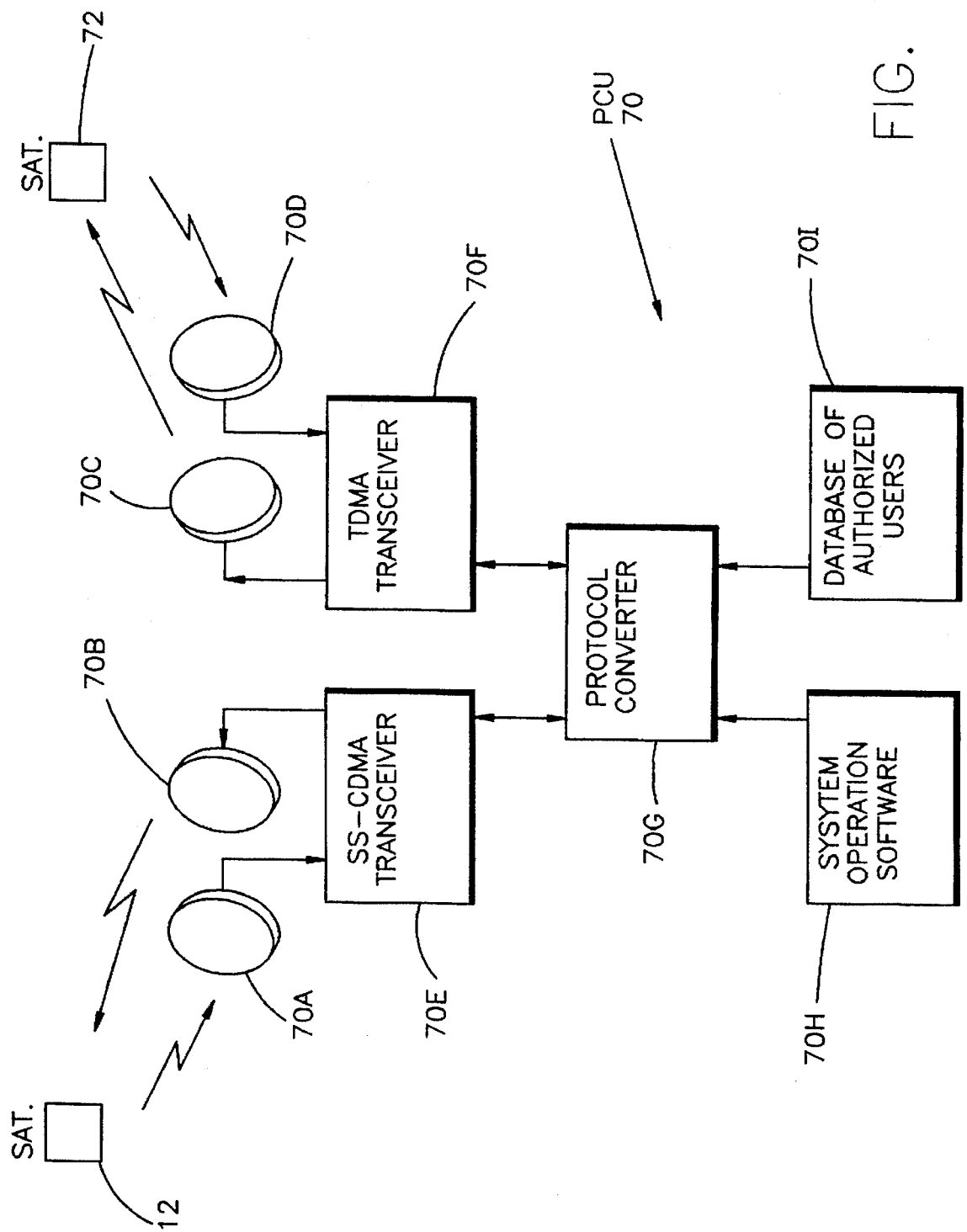
FIG. 7 is a block diagram that illustrates in greater detail the protocol conversion system of FIG. 6.

FIG. 7 shows the PCU 70 in greater detail. The PCU 70 includes a receive antenna 70A and a transmit antenna 70B for communicating with the satellite 12. Antennas 70A and 70B may be directional or omni-directional antennas. Connected to the antenna 70A and 70B is a SS-CDMA transceiver 70E which may be constructed as described above with respect to FIGS. 2 and 5. The PCU 70 also includes a transmit antenna 70C and a receive antenna 70D for bi-directionally communicating with the satellite 72 of system 2. Antennas 70C and 70D may also be directional or omni-directional antennas. Connected to the antennas 70C and 70D is a TDMA transceiver 70F. Bidirectionally coupled to transceivers 70E and 70F is a protocol converter 70G. The protocol converter 70G downconverts and demodulates a received transmission, extracts relevant information from the demodulated transmission, and reformats the information into a form suitable for transmission into the other system. By example, a SS-CDMA transmission is despread and demodulated, the information is extracted therefrom, the format of the information is changed as required, and the information is thereafter packetized into at least one time slot of a TDMA frame for transmission via the TDMA transceiver 70F and the transmit antenna 70C. If required, protocol converter 70G adds information that is required by system 2 but not by the system 1, and strips away information that is required in the system 1 but not in the system 2. Vocoded speech information may also be decoded to an analog format or, by example, to a 64 kb/s PCM format, and then encoded again in accordance with the vocoding technique used in the destination system. By example, one system may use a variable rate speech coder while the other system may use a fixed rate speech coder. Call signalling and overhead information is also translated as required. For example, time alignment information may be required in the TDMA system 2 to accurately synchronize uplink bursts from the PCU 70, while this information may not be required at all in the system 1.

The protocol converter 70G operates under the control of system operation software 70H which includes the specifications for the air interfaces of both the system 1 and the system 2. The protocol converter 70G may also be connected to a database of authorized users 70I. This database may be checked before translating a communication to ensure that the originating party is authorized to use the system into which the call is directed. A user identification is typically a part of the information received with a call request signal.

The PCU 70 is preferably constructed to provide duplication of those components that are specific to each of the communication systems. For example, the vocoders, the modulators and demodulators, the channelization and down-conversion circuitry, timing and synchronization circuitry, transmitters and receivers, and possibly also the antennas are duplicated with one set being provided for each of the two systems.

It can be appreciated that only one PCU 70 is required within the coverage range of the first system. In that the second system in this example enables direct satellite-to-satellite links, it is necessary only to provide a communication path to one of the satellites 72 in order to obtain world-wide coverage.

Although described in the context of a SS-CDMA communication system for the system 1, the teaching of this invention is not so limited. That is, the teaching of this invention may also be used with other types of first and second communication systems, such as frequency division multiple access (FDMA) systems and also hybrid systems, such as a TD-SS communication system. Furthermore, both the system 1 and the system 2 could use, by example, dissimilar types of SS-CDMA or TDMA techniques. For example, both the system 1 and the system 2 could be SS-CDMA type systems that are not, however, compatible with one another in one or more of frequency plan, bit rate, modulation type, signalling format, vocoder type, etc. In this case the PCU 70 performs the necessary transformations when transmitting into and receiving from the two SS-CDMA systems.

Furthermore, although the PCU 70 has been described in the context of two system protocol conversion, it should be realized that the PCU 70 could contain three or more distinct protocol conversion systems for interfacing to three or more different types of satellite-based communication systems.

Thus, while the invention has been particularly shown and described with respect to preferred embodiments thereof, it will be understood by those skilled in the art that changes in form and details may be made therein without departing from the scope and spirit of the invention.

What is claimed is:

1. A communication repeater unit, comprising:

a first transceiver for bidirectionally communicating with at least one first satellite of a first satellite-based communication system;

a second transceiver for bidirectionally communicating with at least one second satellite of a second satellite-based communication system;

wherein said first satellite-based communication system employs a first protocol, wherein said second satellite-based communication system employs a second protocol, wherein the first protocol is different than the second protocol; and wherein said repeater unit further comprises, a protocol converter that is bidirectionally coupled to said first transceiver and to said second transceiver for receiving a transmission from one of said satellite-based communication systems, for converting the received transmission to the protocol employed by the other satellite-based communication system, and for transmitting a protocol-converted transmission to the other satellite-based communication system; and wherein said first and second transceivers are both located at a terrestrial location.

2. A communication repeater unit as set forth in claim 1 and further comprising a data base of authorized users, and wherein said protocol converter converts a received transmission only if the received transmission is originated by a user that is recorded in the data base of authorized users.

3. A communication repeater unit as set forth in claim 1, wherein said first satellite-based communication system employs a spread spectrum, code division multiple access-based protocol, and wherein said second satellite-based communication system employs a time division, multiple access-based protocol.

4. A communication system as set forth in claim 3, wherein said at least one first satellite of said first satellite-based communication system is capable of direct communication only with terrestrial transceivers, including said first transceiver, and wherein said at least one second satellite of said second satellite-based communication system is capable of direct communication with terrestrial transceivers, including said second transceiver, and also with at least one other satellite of said second satellite-based communication system.

5. A hybrid communication system, comprising:

a first satellite-based communication system including at least one first satellite;

a second satellite-based communication system including at least one second satellite;

wherein said first satellite-based communication system employs a first protocol, wherein said second satellite-based communication system employs a second protocol, wherein the first protocol is different than the second protocol; and wherein said hybrid communication system further comprises at least one protocol conversion unit that includes, a first transceiver for bidirectionally communicating with said at least one first satellite of said first satellite-based communication system;

a second transceiver for bidirectionally communicating with said at least one second satellite of said second satellite-based communication system; and a protocol converter that is bidirectionally coupled to said first transceiver and to said second transceiver for receiving a transmission from one of said satellite-based communication systems, for converting the received transmission to the protocol employed by the other satellite-based communication system, and for transmitting a protocol-converted transmission to the other satellite-based communication system; and wherein said first and second transceivers are both located at a terrestrial location.

6. A hybrid communication system as set forth in claim 5 wherein said at least one first satellite is a low earth orbit satellite comprising means for receiving a communication uplink feeder link from at least one ground station and means for transmitting the received communication feeder link to a plurality of terrestrially located terminals that are located within a downlink coverage area associated with said first satellite, and wherein said at least one ground station comprises means for transmitting said communication feeder link to said at least one first satellite and further comprises means for coupling said communication feeder link to a terrestrially located communication system.

7. A hybrid communication system as set forth in claim 5 wherein said protocol converter further comprises a data base of authorized users, and wherein said protocol converter converts a received transmission only if the received transmission is originated by a user that is recorded in the data base of authorized users.

8. A hybrid communication system as set forth in claim 5, wherein said first satellite-based communication system employs a spread spectrum, code division multiple access-based protocol, and wherein said second satellite-based communication system employs a time division, multiple access-based protocol.

9. A hybrid communication system as set forth in claim 8 wherein said at least one first satellite of said first satellite-based communication system is capable of direct communication only with terrestrial transceivers, including said first transceiver, and wherein said at least one second satellite of said second satellite-based communication system is capable of direct communication with terrestrial transceivers, including said second transceiver, and also with at least one other satellite of said second satellite-based communication system.

10. A method for communicating from one user terminal to another user terminal, comprising the steps of:

originating a communication at a first terminal;

relaying the communication through a ground station to at least one satellite of a first satellite-based communication system, the first satellite-based communication system operating in accordance with a first protocol;

repeating the communication with the at least one first satellite;

receiving the repeated communication with a terrestrially located receiver;

converting the received, repeated communication into a communication with a second protocol that is associated with a second satellite-based communication system;

transmitting the converted communication into the second satellite-based communication system with a terrestrially located transmitter;

receiving the transmitted converted communication with at least one second satellite of the second satellite-based communication system; and delivering the converted communication to a second terminal.

11. A method as set forth in claim 10 wherein the step of delivering includes a step of relaying the converted communication from the at least one second satellite to at least one further satellite of the second satellite-based communication system.

12. A method as set forth in claim 10 wherein the step of converting includes an initial step of determining if the communication was initiated by a user that is recorded in a data base of authorized users.

13. A method as set forth in claim 10, wherein the first satellite-based communication system employs a spread spectrum, code division multiple access-based protocol, and wherein the second satellite-based communication system employs a time division, multiple access-based protocol.

14. A method as set forth in claim 10, wherein the step of converting converts at least one of access type, modulation type, frequency plan, bit rate, signalling format, error protection technique, power level control, voice coding technique, voice coding rate, access and paging format, call set-up format, and handover technique.

15. A method as set forth in claim 10, wherein the first satellite-based communication system employs a first spread spectrum, code division multiple access-based protocol, and wherein the second satellite-based communication system employs a second spread spectrum, code division multiple access-based protocol that differs from the first spread spectrum, code division multiple access-based protocol.

16. A method as set forth in claim 10, wherein the communication that is converted from the first protocol to the second protocol is a pager communication.

17. A communication system, comprising:

a first satellite-based communication system including at least one first satellite;

a second satellite-based communication system including at least one second satellite;

wherein said first satellite-based communication system employs a first protocol for communicating a pager message, wherein said second satellite-based communication system employs a second protocol for communicating a pager message, wherein the first protocol is different than the second protocol; and wherein said hybrid communication system further comprises at least one protocol conversion unit that includes, a first transceiver for bidirectionally communicating with said at least one first satellite of said first satellite-based communication system;

a second transceiver for bidirectionally communicating with said at least one second satellite of said second satellite-based communication system; and a protocol converter that is bidirectionally coupled to said first transceiver and to said second transceiver for receiving a pager communication transmission from one of said satellite-based communication systems, for converting the received pager transmission to the protocol employed by the other satellite-based communication system, and for transmitting a protocol-converted pager communication transmission to the other satellite-based communication system; wherein said first and second transceivers are both located at a terrestrial location.

18. A communication system as set forth in claim 17 wherein said at least one first satellite is a low earth orbit satellite comprising means for receiving a communication uplink feeder link from at least one ground station and means for transmitting the received communication feeder link to a plurality of terrestrially located terminals that are located within a downlink coverage area associated with said first satellite, and wherein said at least one ground station comprises means for transmitting said communication feeder link to said at least one first satellite and further comprises means for coupling said communication feeder link to a terrestrially located communication system.

19. A communication system as set forth in claim 17 wherein said protocol converter further comprises a data base of authorized users, and wherein said protocol converter converts a received pager communication transmission only if the received pager communication transmission is associated with a user that is recorded in the data base of authorized users.

20. A communication system as set forth in claim 17, wherein said first satellite-based communication system employs a spread spectrum, code division multiple access-based protocol, and wherein said second satellite-based communication system employs a time division, multiple access-based protocol.

21. A communication system as set forth in claim 17, wherein said at least one first satellite of said first satellite-based communication system is capable of direct communication only with terrestrial transceivers, including said first transceiver, and wherein said at least one second satellite of said second satellite-based communication system is capable of direct communication with terrestrial transceivers, including said second transceiver, and also with at least one other satellite of said second satellite-based communication system.

22. A communication method, comprising the steps of:

originating a communication in a first satellite communication system that operates in accordance with a first air interface specification;

transmitting the communication from a satellite of the first satellite communication system to a ground station;

receiving the communication at the ground station;

converting the received communication from the first air interface specification to a second air interface specification used by a second satellite communication system;

transmitting the converted communication from the ground station to a satellite of the second satellite communication system;

receiving the converted communication with the satellite of the second satellite communication system; and delivering the converted communication to a ground terminal via the satellite of the second satellite communication system.

23. A method as set forth in claim 22, wherein the step of delivering includes a step of relaying the converted communication from the satellite of the second satellite communication system through at least one further satellite of the second satellite communication system.

* * * * *